United States Patent
Chang

(10) Patent No.: US 9,626,044 B2
(45) Date of Patent: Apr. 18, 2017

(54) SYSTEM AND METHOD FOR SCANNING CONTROL OF A CAPACITIVE TOUCH PANEL

(75) Inventor: Chin-Fu Chang, Taipei (TW)

(73) Assignee: EGALAX_EMPIA TECHNOLOGY INC., Taipei (TW)

(*) Notice: Subject to any disclaimer, the term of this patent is extended or adjusted under 35 U.S.C. 154(b) by 1199 days.

(21) Appl. No.: 12/822,828

(22) Filed: Jun. 24, 2010

(65) Prior Publication Data
US 2010/0259505 A1   Oct. 14, 2010

Related U.S. Application Data

(63) Continuation-in-part of application No. 11/519,094, filed on Sep. 12, 2006, now abandoned.

(30) Foreign Application Priority Data

Jun. 20, 2006 (TW) ................................ 95122033 A

(51) Int. Cl.
G06F 3/041 (2006.01)
G06F 3/044 (2006.01)

(52) U.S. Cl.
CPC ............ *G06F 3/044* (2013.01); *G06F 3/0416* (2013.01)

(58) Field of Classification Search
CPC ............ G06F 3/044; G06F 3/0416; G06F 3/041–3/47; G06F 2203/041–2203/04113
USPC .......... 345/173; 341/26; 178/18.06; 73/862.041
See application file for complete search history.

(56) References Cited

U.S. PATENT DOCUMENTS

| | | | |
|---|---|---|---|
| 4,556,871 A * | 12/1985 | Yoshikawa et al. | 341/26 |
| 5,237,879 A * | 8/1993 | Speeter | 73/862.041 |
| 5,861,583 A * | 1/1999 | Schediwy et al. | 178/18.06 |
| 5,940,065 A | 8/1999 | Babb et al. | |
| 6,333,736 B1 | 12/2001 | Sandbach | |
| 6,373,474 B1 | 4/2002 | Katabami | |
| 6,977,646 B1 | 12/2005 | Hauck et al. | |
| 7,355,592 B2 | 4/2008 | Hong et al. | |
| 7,362,313 B2 | 4/2008 | Geaghan et al. | |
| 8,144,125 B2 * | 3/2012 | Peng et al. | 345/173 |
| 2004/0095333 A1 * | 5/2004 | Morag et al. | 345/173 |
| 2005/0041018 A1 | 2/2005 | Philipp | |

* cited by examiner

*Primary Examiner* — Matthew Sim
(74) *Attorney, Agent, or Firm* — WPAT, PC; Justin King

(57) ABSTRACT

This invention provides a system for scanning control of a capacitive touch panel. The system includes a driving unit driving a partially neighboring strips of a plurality of first axial conductive strips of the capacitive touch panel, wherein the plurality of first axial conductive strips are parallel to each other, and a first detecting unit detecting one of the partially neighboring strips of first axial conductive strips. By doing so, the influence caused by unintended conducting materials can be kept from the touch point detection for the capacitive touch panel, and the electromagnetic interference of the capacitive touch panel can be also decreased.

26 Claims, 5 Drawing Sheets simultaneously driving a partially neighboring strips of a plurality of first axial conductive strips of a capacitive touch panel by a driving unit
302

detecting one of the partially neighboring strips of first axial conductive strips by a first detecting unit
304

processing a first data receiving from the first detecting unit by a signal processing unit
306

receiving a second data from the signal processing unit and controlling the driving unit and the first detecting unit by a control unit
308

FIG.3A

SYSTEM AND METHOD FOR SCANNING CONTROL OF A CAPACITIVE TOUCH PANEL

CROSS REFERENCE TO RELATED APPLICATIONS

This application is a continuation-in-part of co-pending application Ser. No. 11/519,094, filed Sep. 12, 2006.

BACKGROUND OF THE INVENTION

1. Field of the Invention

This invention generally relates to the field of touch panel, and more particularly, to a system and method for scanning control of a capacitive touch panel.

2. Description of the Prior Art

Most people often use electronic devices equipped with touch-controlled displays in their daily lives, for example an automated teller machine or a copy machine. By slightly touching icons shown on the display, a user can easily operate the desired functions. The touch-controlled operation is provided by a transparent touch panel mounted on the surface of the display. The touch panels can be categorized to resistive type, capacitive type, and surface wave type. When putting a finger on the resistive touch panel, a voltage signal occurs for calculating coordinate information of the touch point. For the capacitive touch panel, the coordinate information is obtained based on variations of electrical current since a user's finger can absorb a minor current when touching the panel.

Referring to FIG. 1, a schematic diagram for a well-known driving/detecting control system 100 of a capacitive touch panel is illustrated. A capacitive touch panel 110 has m first axial conductive strips $X_0$-$X_{m-1}$, each of which being parallel with each other, and also has n second axial conductive strips $Y_0$-$Y_{n-1}$, each of which being parallel with each other, wherein m≥3, n≥3, and m, n are natural number. Herein, the m first axial conductive strips $X_0$-$X_{m-1}$ intersect the n second axial conductive strips $Y_0$-$Y_{n-1}$ with electrical isolation. A driving/detecting unit 120 is adapted to drive and detect the m first axial and the n second axial conductive strips $X_0$-$X_{m-1}$ and $Y_0$-$Y_{n-1}$. In one embodiment, for example, the driving/detecting unit 120 drives one first axial conductive strip and detects it, and then repeats the operations to the one next to it until all m first axial conductive strips $X_0$-$X_{m-1}$ being driven and detected. However, when the capacitive touch panel 110 has an unintended conducting material (not shown) on it, such as water or other conducting materials, the equivalent circuit and the equivalent stray capacitance between the axial conductive strips at the unintended conducting material will be changed. This change makes the driving/detecting unit 120 detect the current change or charge change on the axial conductive strips, and then results in misjudgment and mal-operation. Or, when the axial conductive strip related to the touch is provided the driving signal and is detected change in current or charges, the current change or the charge change are affected by the unintended conducting material. That is, those relatively bigger changes of the current or charges are bypassed to the adjacent axial conductive strip to ground through the unintended conducting material. Therefore, the position of the touch cannot be correctly detected.

One solution to the abovementioned problem is to drive all same axial conductive strips and then to detect one conductive strip thereof. Since all same axial conductive strips are driven, this makes all same axial conductive strips have the same voltage level. In the meantime, there is no voltage difference among all same axial conductive strips, so there is no current loop among them as well. If an unintended conducting material exists on the capacitive touch panel in the meanwhile, the unintended conducting material will not form current loops with all same axial conductive strips because there is no voltage difference among them. Therefore, the unintended conducting material does not change the current among all same axial conductive strips. However, this solution makes both power consumption and electro-magnetic interference increase.

In view of the drawbacks mentioned with the prior art of scanning control of a capacitive panel, there is a continuous need to develop a new and improved system and method for scanning control of a capacitive panel that overcomes the shortages associated with the prior art. The advantages of the present invention are that it solves the problems mentioned above.

SUMMARY OF THE INVENTION

In accordance with the present invention, a system and method for scanning control of a capacitive touch panel substantially obviates one or more of the problems resulted from the limitations and disadvantages of the prior art mentioned in the background.

The present invention provides a system for scanning control of a capacitive touch panel. The system includes a driving unit driving a partially neighboring strips of a plurality of first axial conductive strips of the capacitive touch panel at the same time, wherein the plurality of first axial conductive strips are parallel to each other, and a first detecting unit detecting one of the partially neighboring strips of first axial conductive strips. By doing so, the influence caused by unintended conducting materials can be kept from the touch point detection for the capacitive touch panel, and the electro-magnetic interference of the capacitive touch panel can be also decreased.

In an alternate preferred embodiment, the driving unit further drives a partially neighboring strips of a plurality of second axial conductive strips of the capacitive touch panel at the same time, wherein the plurality of second axial conductive strips are parallel to each other and intersect with the plurality of first axial conductive strips with electrical isolation, and a second detecting unit detects one of the partially neighboring strips of second axial conductive strips.

The present invention provides a method for scanning control of a capacitive touch panel. The method includes driving a partially neighboring strips of a plurality of first axial conductive strips of the capacitive touch panel simultaneously by a driving unit, wherein the plurality of first axial conductive strips are parallel to each other, and detecting one of the partially neighboring strips of first axial conductive strips by a first detecting unit. By doing so, the influence caused by unintended conducting materials can be kept from the touch point detection for the capacitive touch panel, and the electro-magnetic interference of the capacitive touch panel can be also decreased.

In an alternate preferred embodiment, the method further includes driving a partially neighboring strips of a plurality of second axial conductive strips of the capacitive touch panel simultaneously by the driving unit, wherein the plurality of second axial conductive strips are parallel to each other and intersect with the plurality of first axial conductive strips with electrical isolation, and detecting one of the partially neighboring strips of second axial conductive strips by a second detecting unit.

BRIEF DESCRIPTION OF THE DRAWINGS

The accompanying drawings incorporated in and forming a part of the specification illustrate several aspects of the present invention, and together with the description serve to explain the principles of the disclosure. In the drawings:

FIG. 3A illustrates a flow chart for one preferred embodiment in accordance with the present invention.

DETAILED DESCRIPTION OF THE PREFERRED EMBODIMENTS

Some embodiments of the present invention will now be described in greater detail. Nevertheless, it should be noted that the present invention can be practiced in a wide range of other embodiments besides those explicitly described, and the scope of the present invention is expressly not limited except as specified in the accompanying claims.

Moreover, some irrelevant details are not drawn in order to make the illustrations concise and to provide a clear description for easily understanding the present invention.

Figure 1:
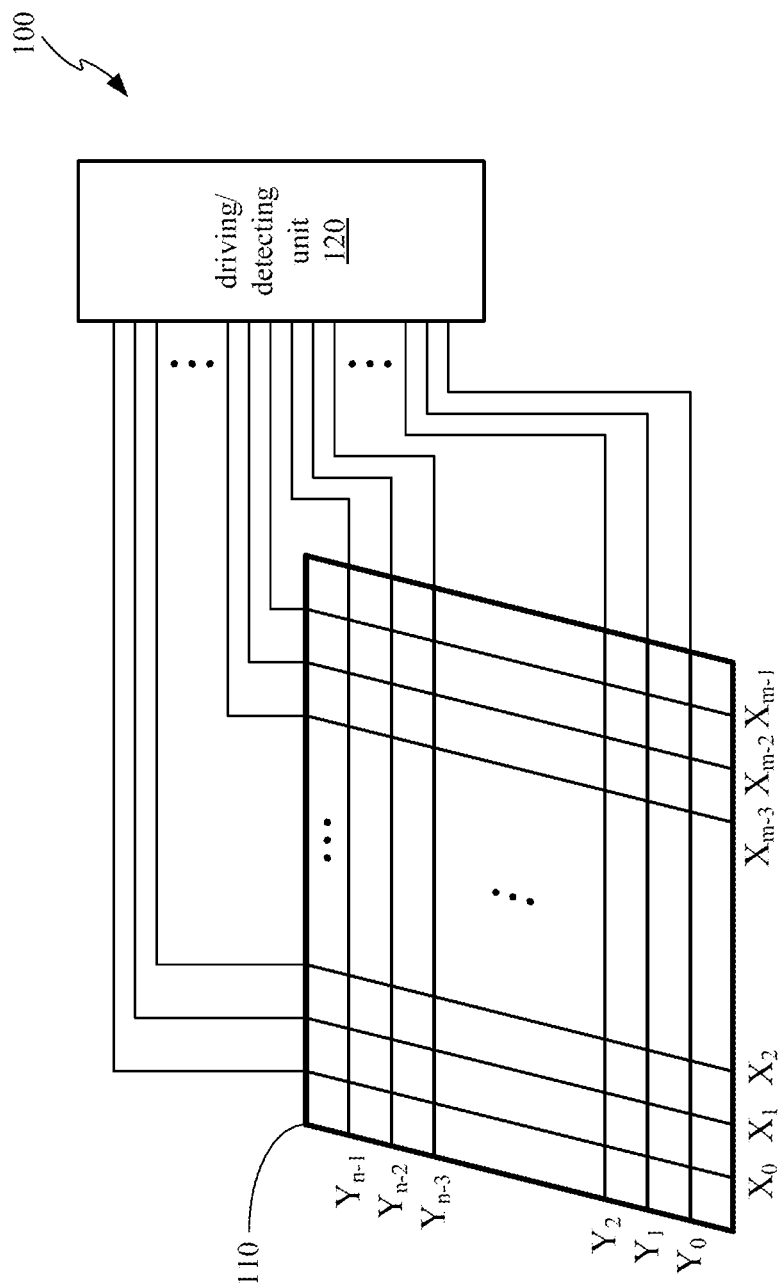
FIG. 1 shows a well-known driving/detecting control system for a capacitive touch panel.
Figure 2A:
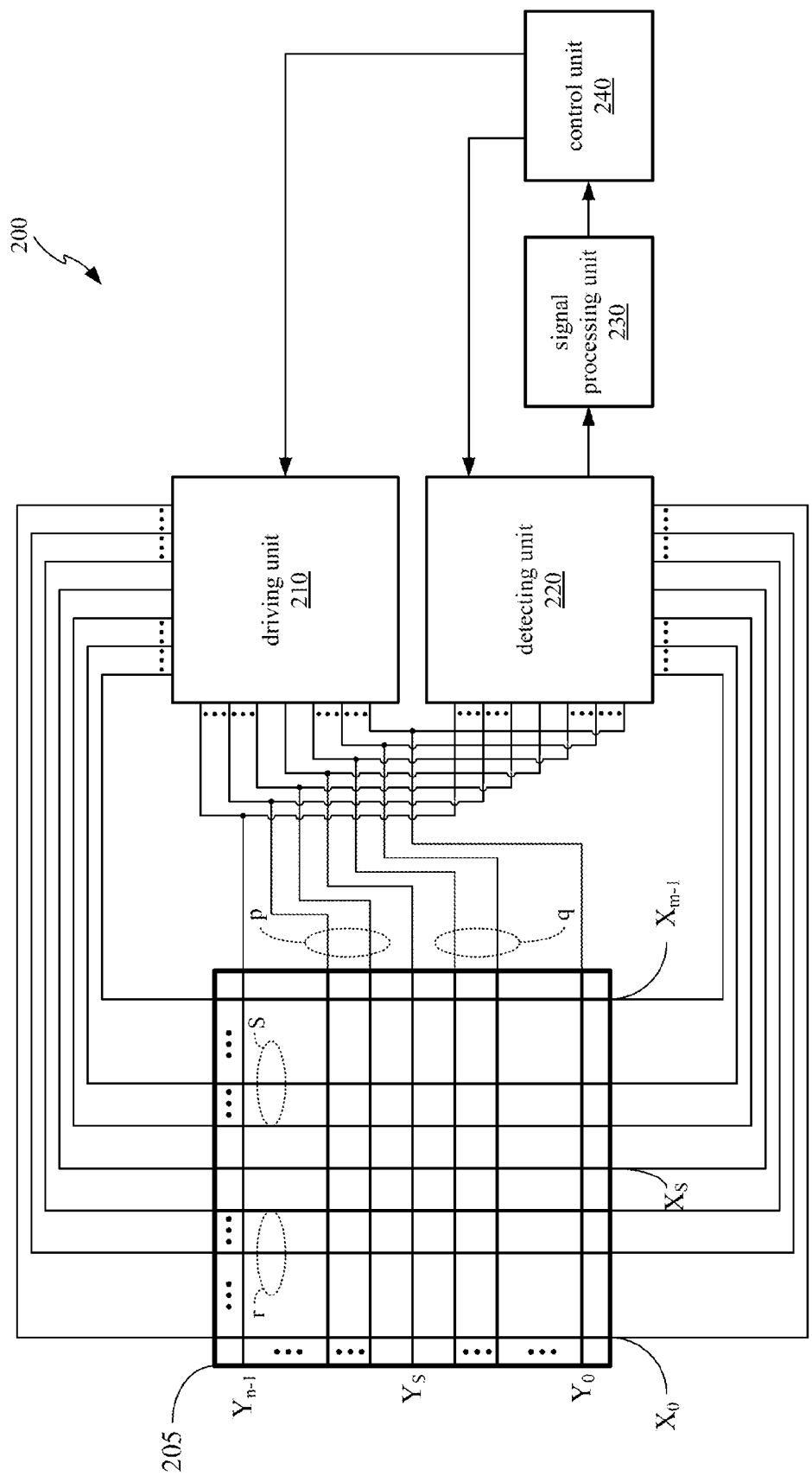
FIG. 2A depicts one preferred embodiment in accordance with the present invention.

Referring to FIG. 2A, a schematic diagram for one preferred embodiment 200 in accordance with the present invention is depicted. A capacitive touch panel 205 has m first axial conductive strips $X_0$-$X_{m-1}$, each of which being parallel with each other, wherein m≥3 and m is natural number. The capacitive touch panel 205 also has n second axial conductive strips $Y_0$-$Y_{n-1}$, each of which being parallel with each other, wherein n≥3 and n is natural number. Herein, the m first axial conductive strips $X_0$-$X_{m-1}$ intersect the n second axial conductive strips $Y_0$-$Y_{n-1}$ with electrical isolation. A driving unit 210 simultaneously drives a partially neighboring strips of m first axial conductive strips $X_0$-$X_{m-1}$ in sequence or in interleaving or by assigned until all m first axial conductive strips $X_0$-$X_{m-1}$ being detected over by a detecting unit 220. Herein, the partially neighboring strips of m first axial conductive strips $X_0$-$X_{m-1}$ include 3-7 first axial conductive strips. For example, the driving unit 210 drives r first axial conductive strip(s), $X_s$, and s first axial conductive strip(s) at the same time, herein 1≤r≤3, 1≤s≤3 and r, s are natural number. The detecting unit 220 detects one of the partially neighboring strips of first axial conductive strips driven by the driving unit 210. In one preferred case, the one (e.g. $X_s$) of the partially neighboring strips of first axial conductive strips positions at the middle of the partially neighboring strips of first axial conductive strips, but not limit to. In some cases, the one of the partially neighboring strips of first axial conductive strips could not position at the middle of the partially neighboring strips of first axial conductive strips.

Similarly, the operations for the driving unit 210 and the detecting unit 220 to the n second axial conductive strips $Y_0$-$Y_{n-1}$ are similar to those descriptions mentioned above to the m first axial conductive strips $X_0$-$X_{m-1}$. For example, the driving unit 210 drives p second axial conductive strip(s), $Y_s$, and q second axial conductive strip(s) at the same time, herein 1≤p≤3, 1≤q≤3 and p, q are natural number. For example, in one preferred case, the one (e.g. $Y_s$) of the partially neighboring strips of second axial conductive strips positions at the middle of the partially neighboring strips of second axial conductive strips, but in some cases, the one of the partially neighboring strips of second axial conductive strips could not position at the middle of the partially neighboring strips of second axial conductive strips.

A signal processing unit 230 processes a first data receiving from the detecting unit 220. A control unit 240 receives a second data from the signal processing unit 230 and controls the driving unit 210 and the detecting unit 220. Herein, the first data is translated into the second data by filtering, sampling, amplifying, and analog-to-digital converting.

In accordance with another aspect of the present invention, a plurality of detecting units can be adapted to detect a correspondingly partial of the same axial conductive strips, which are next to each other, For example, a first detecting unit is in charge of $X_0$-$X_{127}$, a second detecting unit is in charge of $X_{128}$-$X_{255}$, a third detecting unit is in charge of $X_{256}$-$X_{383}$, and so forth, for speeding up detection. And then, one or multiple switching unit(s) is(are) used to switch and receive data from the plurality of detecting units. However, the plurality of detecting units may still have different electronic characteristics although they are composed of the same circuit and electronic elements. Accordingly, this makes the data slightly different from different detecting units. For example, a first detecting unit detects a charge on $X_0$ being smaller than a threshold but the charge on $X_0$ would be higher than the threshold if it is detected by a second detecting unit. That is, the plurality of detecting unit for the detection of the same axial conductive strip are lack of a regulation among them and hence make the detection error easily. Moreover, the plurality of detecting units also get different decay rate after a period of use, and this makes the problem mentioned above more serious. As for the present invention, the same axial conductive strips are detected by one detecting unit and further with the same effect resulted from the decay of the detecting unit. Therefore, the problem mentioned above would not occur and be solved in the present invention.

Figure 2B:
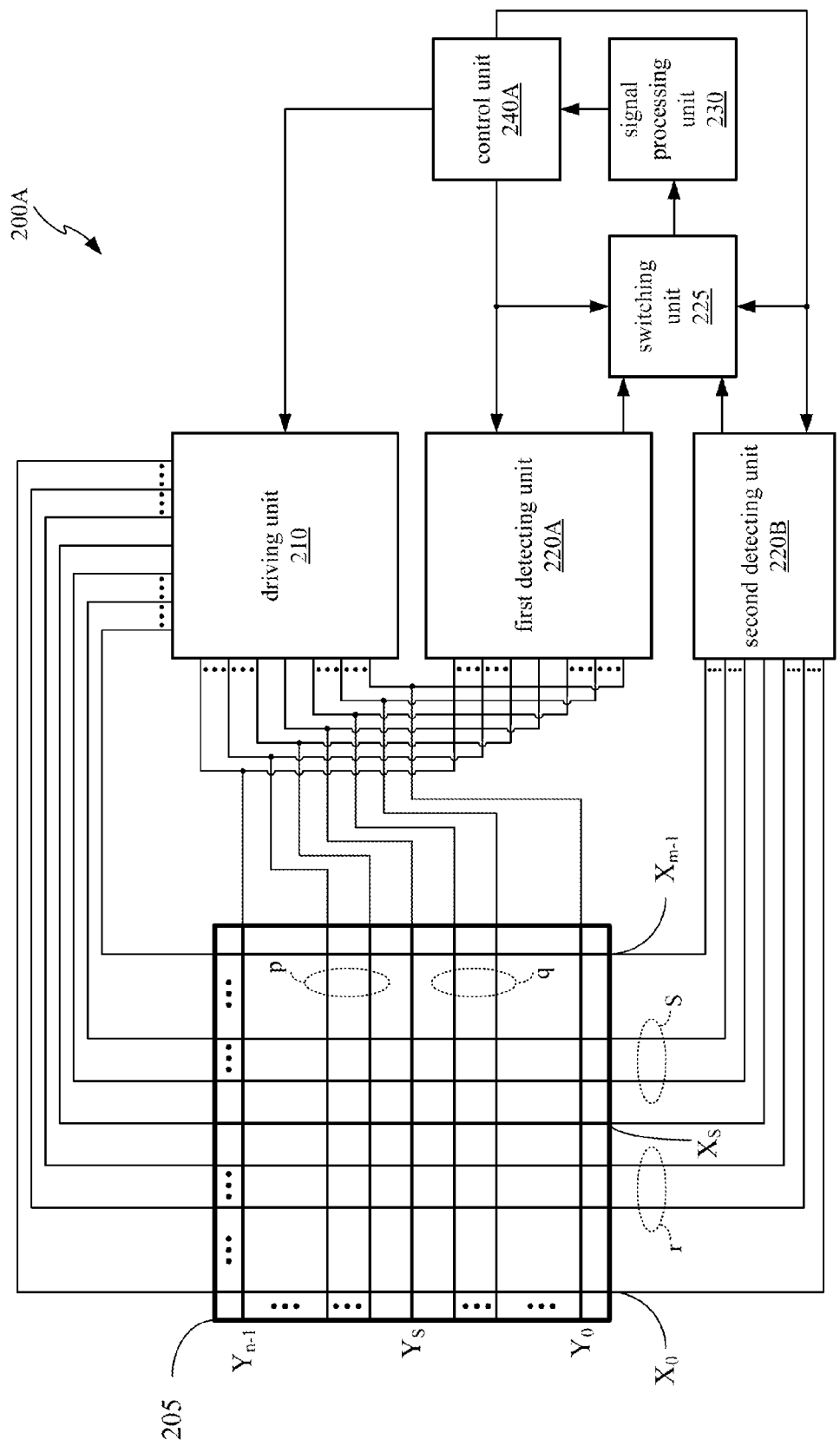
FIG. 2B depicts another preferred embodiment in accordance with the present invention.

Referring to FIG. 2B, a schematic diagram for another preferred embodiment 200A in accordance with the present invention is depicted. The differences between FIG. 2A and FIG. 2B are that two detecting units 220A and 220B are used to respectively detect the n second axial conductive strips $Y_0$-$Y_{n-1}$ and the m first axial conductive strips $X_0$-$X_{m-1}$, and that a switching unit 225 is adapted to switch and receive a first data from the two detecting units 220A and 220B to the signal processing unit 230, and the control unit 240A further controls the two detecting units 220A and 220B and the switching unit 225. However, the operations in FIG. 2B are similar to those mentioned in FIG. 2A, for example, the driving unit 210 drives a partially neighboring strips of m first axial conductive strips $X_0$-$X_{m-1}$ at the same time, and the detecting unit 220B detects one of the partially neighboring strips of first axial conductive strips; and the driving unit 210 further drives a partially neighboring strips of n second axial conductive strips $Y_0$-$Y_{n-1}$, and the detecting unit 220A detects one of the partially neighboring strips of second axial conductive strips. As for the meanings of the denotations shown in FIG. 2B, such as $X_s$, $Y_s$, p, q, r, and s, are the same as those descriptions in FIG. 2A, and this part can be figured out by one ordinary skilled in the art according to those descriptions in FIG. 2A. Thus, no more detail will be described.

Referring to FIG. 3A, a flow chart for one preferred embodiment in accordance with the present invention is illustrated. In step 302, simultaneously driving a partially neighboring strips of a plurality of first axial conductive strips of a capacitive touch panel by a driving unit. Herein, the plurality of first axial conductive strips are parallel to each other in X-axial (or Y-axial). In step 304, detecting one of the partially neighboring strips of first axial conductive strips by a first detecting unit. Herein, in one preferred case, the one of the partially neighboring strips of first axial conductive strips positions at the middle of the partially neighboring strips of first axial conductive strips, but not limit to. In some cases, the partially neighboring strips of first axial conductive strips include 3-7 first axial conductive strips. In step 306, processing a first data receiving from the first detecting unit by a signal processing unit. In step 308, receiving a second data from the signal processing unit and controlling the driving unit and the first detecting unit by a control unit. Herein, the first data is translated into the second data by including filtering, sampling, amplifying, and analog-to-digital converting.

Figure 3B:
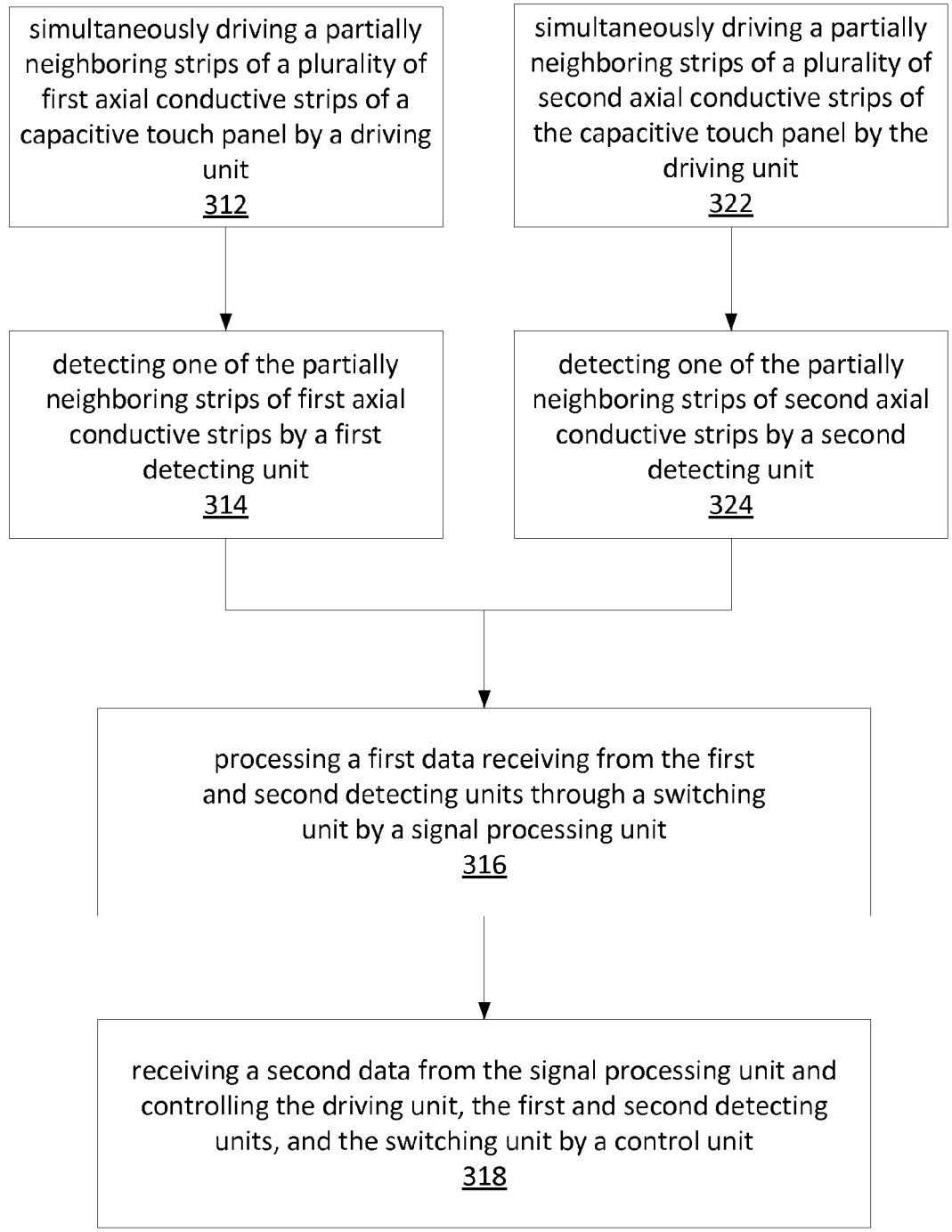
FIG. 3B illustrates a flow chart for another preferred embodiment in accordance with the present invention.

Referring to FIG. 3B, a flow chart for one preferred embodiment in accordance with the present invention is illustrated. In step 312, simultaneously driving a partially neighboring strips of a plurality of first axial conductive strips of a capacitive touch panel by a driving unit. Herein, the plurality of first axial conductive strips are parallel to each other in X-axial (or Y-axial). In step 314, detecting one of the partially neighboring strips of first axial conductive strips by a first detecting unit. Herein, in one preferred case, the one of the partially neighboring strips of first axial conductive strips positions at the middle of the partially neighboring strips of first axial conductive strips, but not limit to. In some cases, the partially neighboring strips of first axial conductive strips include 3-7 first axial conductive strips. In step 322, simultaneously driving a partially neighboring strips of a plurality of second axial conductive strips of the capacitive touch panel by the driving unit. Herein, the plurality of second axial conductive strips are parallel to each other in Y-axial (or X-axial) and intersect with the plurality of first axial conductive strips with electrical isolation. In step 324, detecting one of the partially neighboring strips of second axial conductive strips by a second detecting unit. Herein, in one preferred case, the one of the partially neighboring strips of second axial conductive strips positions at the middle of the partially neighboring strips of second axial conductive strips, but not limit to. In some cases, the partially neighboring strips of second axial conductive strips include 3-7 second axial conductive strips. In step 316, processing a first data receiving from the first and second detecting units through a switching unit by a signal processing unit. In step 318, receiving a second data from the signal processing unit and controlling the driving unit, the first and second detecting units, and the switching unit by a control unit. Herein, the first data is translated into the second data by including filtering, sampling, amplifying, and analog-to-digital converting Although specific embodiments have been illustrated and described, it will be obvious to those skilled in the art that various modifications may be made without departing from what is intended to be limited solely by the appended claims.

What is claimed is:

1. A system for scanning control of a capacitive touch panel,
    wherein said capacitive touch panel comprises a plurality of first axial conductive strips and a plurality of second axial conductive strips, said plurality of first axial conductive strips and second axial conductive strips intersect with each other and are electrically isolated; and
    wherein said plurality of first axial conductive strips are parallel to each other and comprises a first group of N first axial conductive strips and a second group of N first axial conductive strips, said N is equal to or greater than three;
    said system comprising:
    a driving unit, simultaneously driving said first group of said N first axial conductive strips during a first self-capacitive detection and simultaneously driving said second group of said N first axial conductive strips during a second self-capacitive detection; and
    a first detecting unit, detecting only one middle first axial conductive strip of said first group during said first self-capacitive detection and detecting only one middle first axial conductive strip of said second group adjacent to said middle first axial conductive strip of said first group during said second self-capacitive detection, wherein only N−1 first axial conductive strips of said first group and said second group are the same.

2. The system according to claim 1, wherein said second self-capacitive detection is executed after said first self-capacitive detection.

3. The system according to claim 2, wherein said first group and said second group of said first axial conductive strips include 3, 5, or 7 first axial conductive strips.

4. The system according to claim 1, wherein said plurality of first axial conductive strips are X-axial or Y-axial.

5. The system according to claim 1, further comprising a signal processing unit processing a first data receiving from said first detecting unit.

6. The system according to claim 5, further comprising a control unit receiving a second data from said signal processing unit and controlling said driving unit and said first detecting unit.

7. The system according to claim 6, wherein said first data is translated into said second data by including filtering, sampling, amplifying, and analog-to-digital converting.

8. The system according to claim 1,
    wherein during a third self-capacitive detection, said driving unit further simultaneously drives a third group of N second axial conductive strips but a second detecting unit detects only one middle second axial conductive strip of said first group; and
    wherein during a fourth self-capacitive detection, said driving unit then simultaneously drives a fourth second group of N second axial conductive strips but said second detecting unit detects only one middle second axial conductive strip of said second group, wherein only N−1 second axial conductive strips of said third group and said fourth group are the same.

9. The system according to claim 8, wherein said fourth self-capacitive detection is executed after said third self-capacitive detection.

10. The system according to claim 9, wherein said third group and said fourth group of second axial conductive strips include 3, 5, or 7 second axial conductive strips.

11. The system according to claim 8, further comprising a signal processing unit processing a first data receiving from said first and second detecting units through a switching unit.

12. The system according to claim 11, further comprising a control unit receiving a second data from said signal processing unit and controlling said driving unit, said first and second detecting units, and said switching unit.

13. The system according to claim 12, wherein said first data is translated into said second data by including filtering, sampling, amplifying, and analog-to-digital converting.

14. A method for scanning control of a capacitive touch panel,
wherein said capacitive touch panel comprises a plurality of first axial conductive strips and a plurality of second axial conductive strips, said plurality of first axial conductive strips and second axial conductive strips intersect with each other and are electrically isolated; and
wherein said plurality of first axial conductive strips are parallel to each other and comprises a first group of N first axial conductive strips and a second group of N first axial conductive strips, said N is equal to or greater than three;
said method comprising:
executing a first self-capacitive detection of simultaneously driving said first group of said N first axial conductive strips by a driving unit but only detect a middle first axial conductive strip of said first group by a first detecting unit; and
executing a second self-capacitive detection of simultaneously driving said second group of said N first axial conductive strips by said driving unit but only detect a middle first axial conductive strip of said second group adjacent to said middle first axial conductive strip of said first group by said first detecting unit, wherein only N−1 first axial conductive strips of said first group and said second group are the same.

15. The method according to claim 14, wherein said second self-capacitive detection is executed after said first self-capacitive detection.

16. The method according to claim 15, wherein said first group and said second group of first axial conductive strips include 3, 5, or 7 first axial conductive strips.

17. The method according to claim 14, wherein said plurality of first axial conductive strips are X-axial or Y-axial.

18. The method according to claim 14, further comprising processing a first data receiving from said first detecting unit by a signal processing unit.

19. The method according to claim 18, further comprising receiving a second data from said signal processing unit and controlling said driving unit and said first detecting unit by a control unit.

20. The method according to claim 19, wherein said first data is translated into said second data by including filtering, sampling, amplifying, and analog-to-digital converting.

21. The method according to claim 14, further comprising:
executing a third self-capacitive detection of simultaneously driving a third group of N second axial conductive strips by said driving unit but only detect a middle second axial conductive strip of said third group by a second detecting unit; and
executing a fourth self-capacitive detection of simultaneously driving a fourth group of N second axial conductive strips by said driving unit but only detect a middle second axial conductive strip of said fourth group adjacent to said middle second axial conductive strip of said third group by said second detecting unit, wherein only N−1 second axial conductive strips of said third group and said fourth group are the same.

22. The method according to claim 21, wherein said fourth self-capacitive detection is executed after said third self-capacitive detection.

23. The method according to claim 22, wherein said third group and said fourth group of second axial conductive strips include 3, 5, or 7 second axial conductive strips.

24. The method according to claim 21, further comprising processing a first data receiving from said first and second detecting units through a switching unit by a signal processing unit.

25. The method according to claim 24, further comprising receiving a second data from said signal processing unit and controlling said driving unit, said first and second detecting units, and said switching unit by a control unit.

26. The method according to claim 25, wherein said first data is translated into said second data by including filtering, sampling, amplifying, and analog-to-digital converting.

* * * * *